June 21, 1966 W. R. POSTLEWAITE ET AL 3,257,001
TUBE BUNDLE EXTRACTOR
Filed Dec. 23, 1957 10 Sheets-Sheet 1

INVENTORS
WILLIAM R. POSTLEWAITE
ERIC S. WARNER
BY
ATTORNEYS

June 21, 1966 W. R. POSTLEWAITE ET AL 3,257,001

TUBE BUNDLE EXTRACTOR

Filed Dec. 23, 1957 10 Sheets-Sheet 2

INVENTORS
WILLIAM R. POSTLEWAITE
ERIC S. WARNER

BY

ATTORNEYS

INVENTORS
WILLIAM R. POSTLEWAITE
ERIC S. WARNER

BY

ATTORNEYS

June 21, 1966 W. R. POSTLEWAITE ET AL 3,257,001
TUBE BUNDLE EXTRACTOR
Filed Dec. 23, 1957 10 Sheets-Sheet 6

INVENTORS
WILLIAM R. POSTLEWAITE
ERIC S. WARNER
BY
ATTORNEYS

June 21, 1966 W. R. POSTLEWAITE ET AL 3,257,001
TUBE BUNDLE EXTRACTOR
Filed Dec. 23, 1957 10 Sheets-Sheet 9

INVENTORS
WILLIAM R. POSTLEWAITE
ERIC S. WARNER
BY
ATTORNEYS

June 21, 1966  W. R. POSTLEWAITE ET AL  3,257,001
TUBE BUNDLE EXTRACTOR
Filed Dec. 23, 1957　　　　　　　　　　　　　10 Sheets-Sheet 10
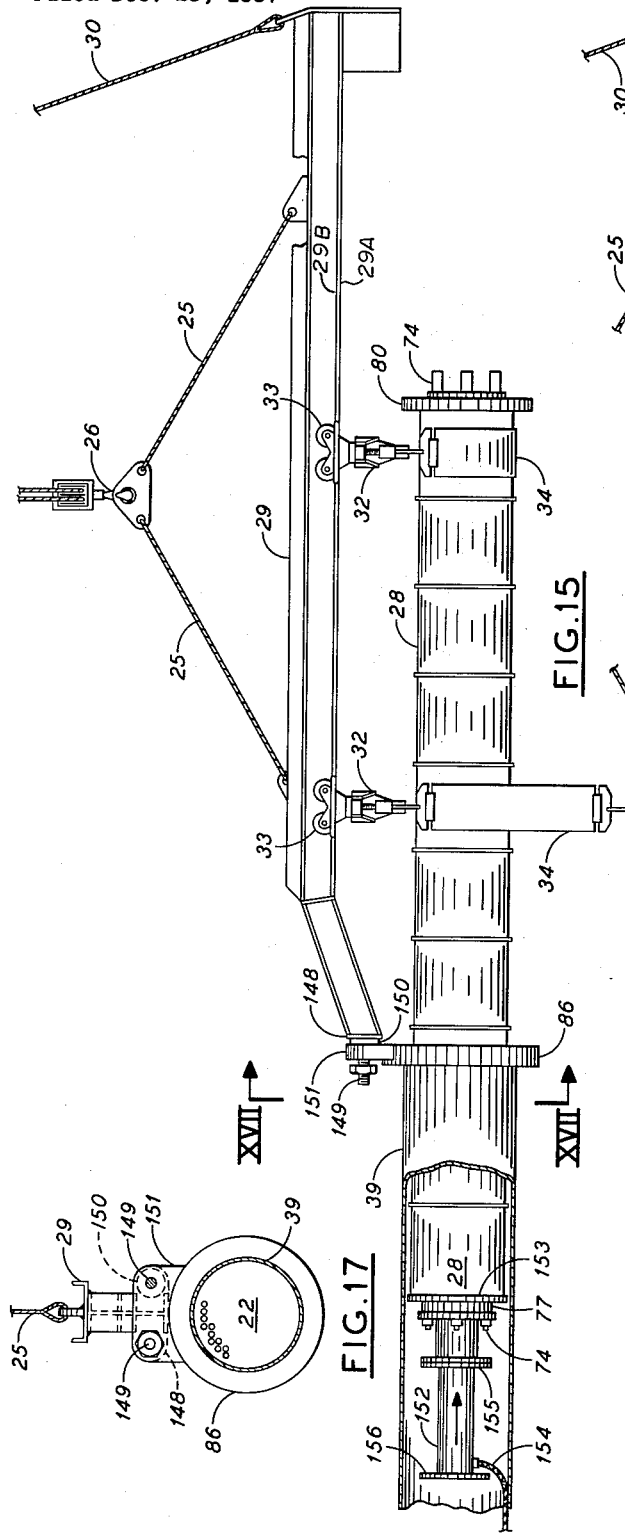
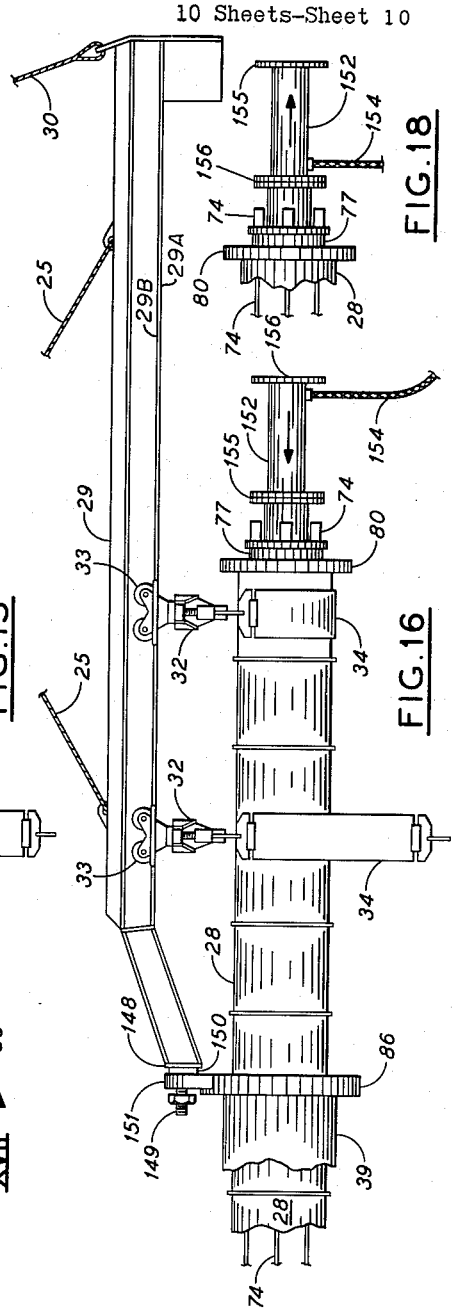
INVENTORS
WILLIAM R. POSTLEWAITE
ERIC S. WARNER
BY
ATTORNEYS United States Patent Office 3,257,001
Patented June 21, 1966

3,257,001
TUBE BUNDLE EXTRACTOR
William R. Postlewaite, Menlo Park, and Eric S. Warner, Berkeley, Calif., assignors to Chevron Research Corporation, a corporation of Delaware
Filed Dec. 23, 1957, Ser. No. 704,390
8 Claims. (Cl. 214—1)

This invention relates to a tube bundle extractor for heat exchangers and the like that are mounted in elevated locations, and particularly refers to a mobile arrangement adapted to be suspended from a hoist aligned with the shell containing the tube bundle, secured to the shell or the bundle or to both, and remotely controlled and actuated to either withdraw or to replace the bundle of tubes in the shell.

In modern chemical processing plants and particularly in petroleum refineries, it is economical, if not essential, to conserve the heat which is required for the process by the use of shell-and-tube heat exchangers which transmit indirectly the heat from a reacted or processed material into the incoming fresh stock, in this example, crude oil. These processes usually involve fractionating equipment for separating the several components, and such equipment is often several hundred feet in height. To conserve piping and for the most economical arrangement, the heat exchangers, coolers and the like associated with such fractionating equipment are supported in structural steel frames which may be upwardly of 60 to 80 feet in height.

Although this process and heat exchange equipment is adapted to run continuously, it is necessary at intervals of several months to remove the tube bundles and to clean deposits of carbon or other materials which may accumulate in the shells and on the tubes. The heat exchangers to which this invention is applied may range from 18 inches to 36 inches in diameter and upwardly of 20 feet in length. The bundles or tubes are supported between tube sheets, the outermost usually secured to the end flange of the shell and the innermost, known as the "floating" tube sheet, adapted to move relatively to the shell to provide for longitudinal expansion and contraction. These bundles of tubes may weigh upwardly of 15,000 pounds each. Due to their length and the small diameter of the tubes, they are quite limber, and because of the necessity for keeping them adequately supported at all times to prevent distortion and possible leakage where the tubes are rolled into the end tube sheets, the routine removal and replacement of these tubes has been an expensive and time-consuming procedure.

Heretofore, it has been the practice to build a permanent structural steel frame extending outwardly from that framework containing the horizontal heat exchangers, and of such dimensions as to receive a monorail or other overhead support aligned with each vertical row of exchangers and adapted to receive one or more hoist carriages that will support the tube bundles as they are withdrawn or replaced. The supplementary framework itself usually furnishes the anchorage for the chain blocks used for pulling out the bundles or for pulling them back into the shells. Such frame construction and hoists are expensive due to their size and infrequent use, as is the cost of rigging and dismantling the pulling equipment, and this invention has demonstrated its ability to render them unnecessary.

The invention comprehends generally a mobile horizontal frame or support adapted to be picked up bodily by a movable crane and aligned with an individual heat exchanger in a vertical bank of exchangers, for example, which may be at substantial elevations above the ground. Means are provided for temporary securing the frame to the shell of the heat exchanger so that it is accurately aligned with the tube bundle to be extracted or replaced.

Various means are provided for exerting the force against this bundle to remove it or replace it in the shell. Under some circumstances, the force-exerting means acts by reciprocating impact, in the nature of a high-speed pile driver. Other embodiments utilize a traveling carriage supported in the frame carrying its own prime mover, which may be an air motor driving a screw thread, or a chain and sprocket arrangement. An essential feature is the provision of longitudinally movable slings which are adjustable vertically to receive and retain the unsupported part of the tube bundle as it is extracted or inserted, to keep it from undue deflection, which would cause excessive friction with respect to the heat exchanger shell, and might result in permanent damage to the tube bundle, and also to align it accurately when replacing the closely fitting bundle in the shell.

It is an object of this invention to provide an improved mobile arrangement for introducing or removing tube bundles from heat exchangers which may be at a considerable elevation above ground level.

Another object is to provide a mobile arrangement which is self-contained and does not require the use of special rigging and permanent or temporary framework adjacent to the structure supporting the heat exchangers.

Another object is to provide a simple and efficient portable tube bundle extractor which may be controlled remotely and safely by a single operator.

These and other objects and advantages will be further apparent from the following specification, which decribes a number of preferred embodiments of the invention, taken in connection with the accompanying drawings which illustrate their construction and mode of operation.

In the drawings, FIGURE 1 is a vertical elevational view of one form of this device, suspended in position to be aligned with a heat exchanger from which the outer closure or head has been removed.

FIGURE 15 is a vertical side elevational view of an alternative frame and force-exerting mechanism of the reciprocating impact type showing a tube bundle partially extracted from its heat exchanger shell by thrust imparted to its inboard end.

FIGURE 16 is a vertical side elevational view of the arrangement of FIGURE 15, illustrating the reciprocating impact force-exerting means secured to the outboard end to replace a tube bundle in its shell by thrusting against face.

FIGURE 17 is a vertical transverse sectional view on line XVII—XVII of FIGURE 15, illustrating a preferred arrangement for removably securing the mobile frame of that embodiment to the end flange of the heat exchanger shell.

FIGURE 18 is a vertical side elevational view of an alternative arrangement to that of FIGURE 16, showing the impact force-exerting means reversed to exert an outward pull on the tube bundle to be extracted.

Figure 1:
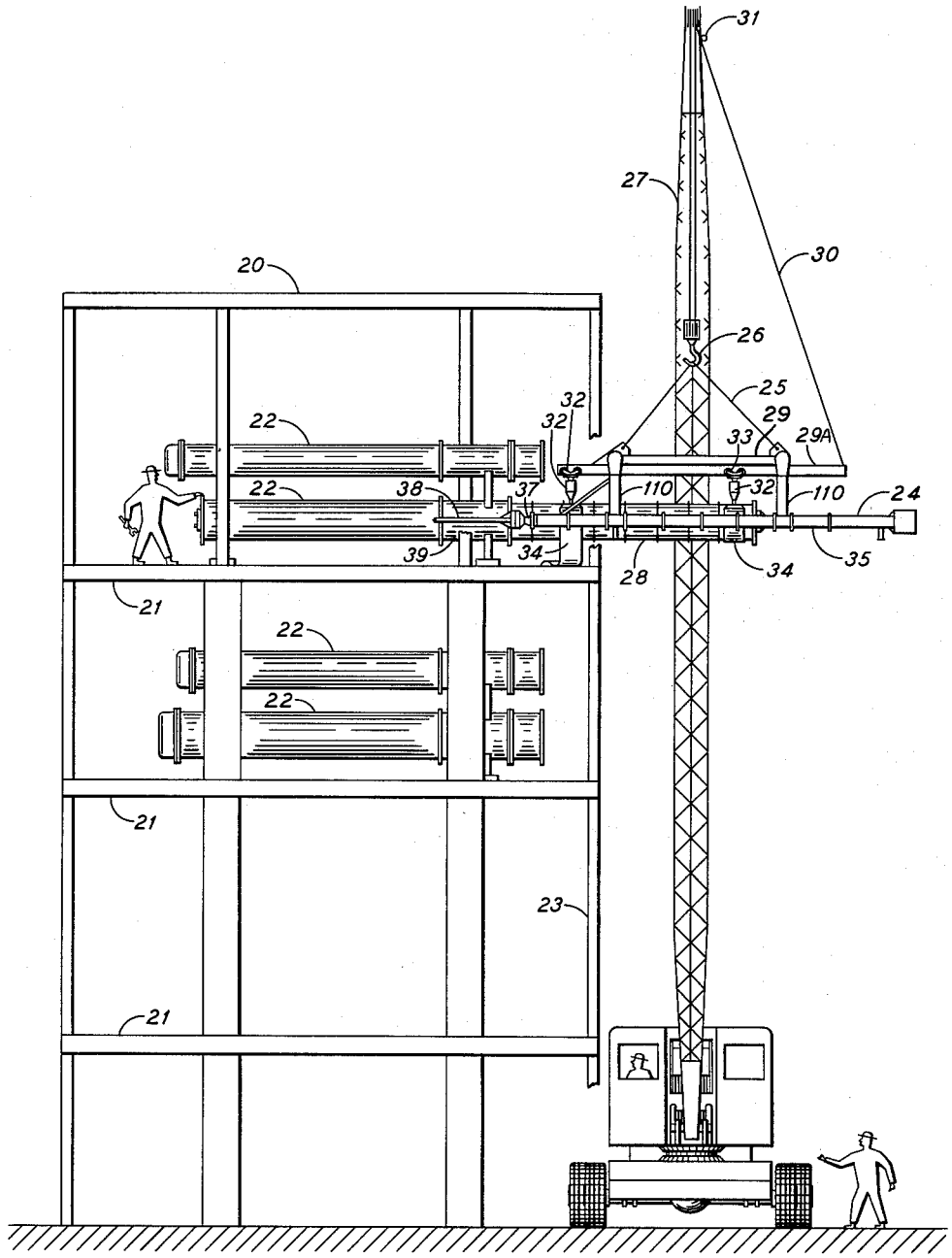
Figure 2:
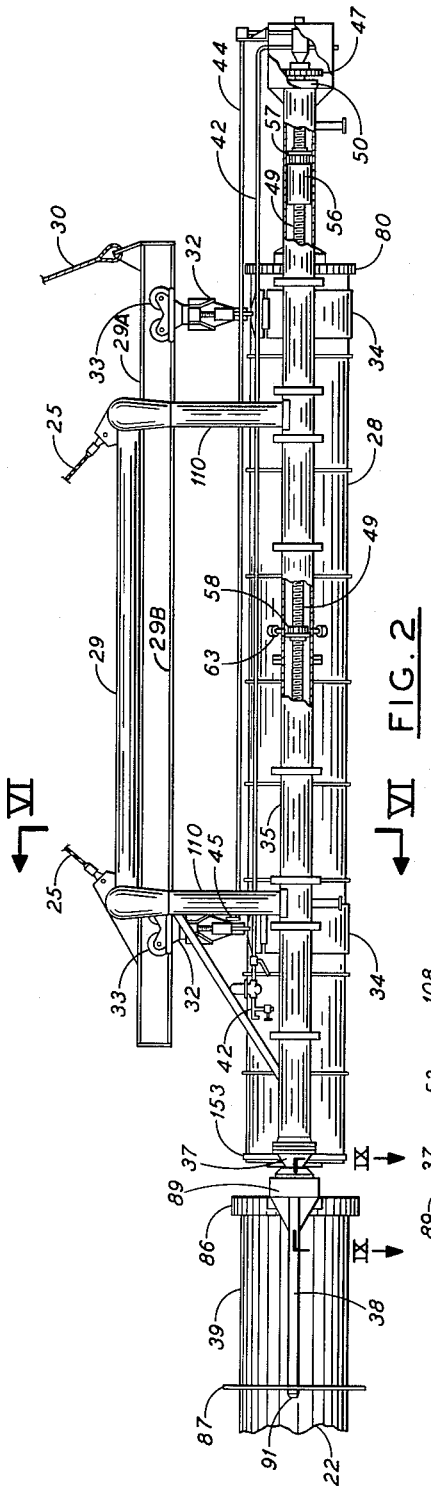
FIGURE 2 is a side elevational view, partially in section, of the form of apparatus of FIGURE 1 showing the device supporting a tube bundle which has been completely extracted from its exchanger shell.
Figure 3:
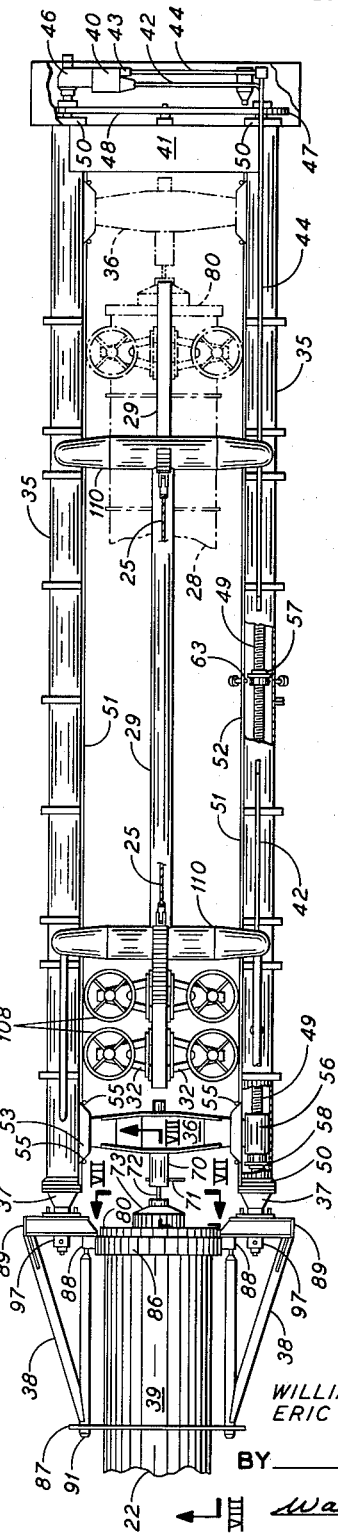
FIGURE 3 is a plan view, partially in section, of the device of FIGURE 2 showing the parts in their fully extended and fully retracted positions.

Referring to the drawings and particularly to FIGURES 1, 2, and 3, reference numeral 20 designates a permanent steel frame structure having a plurality of vertically spaced working platforms 21 and adapted to support a plurality of tubular heat exchangers generally designated 22. The outer end 23 of structure 20 is generally open to provide access to one end of each of the exchangers 22. Piping and connections to exchangers 22 as well as process equipment with which they are associated are not illustrated, as they are not concerned in this invention. The mobile tube bundle extractor generally designated 24 is adapted to be supported by a sling 25 from the hook 26 of a mobile crane 27, to be aligned in the same horizontal and vertical plane as the shell of the heat exchanger 22 from which the bundle of tubes 28 is to be extracted or into which it is to be inserted.

Referring still to FIGURE 1, the tube bundle extractor there illustrated consists generally of a horizontal frame or support 29 which may be stabilized at its outer end by a separate line 30 passing over a pulley 31 on crane 27 to keep the trolley beam 29A formed by an I-beam, that is integral to frame 29, in exact parallel alignment with the axis of and above one end of exchanger 22 at all positions of the tube bundle 28. Supported below trolley beam 29A of frame 29 are one or more sling carriages 32 which are longitudinally movable along the lower flange 29B of trolley beam 29A on wheels 33 to support bundle 28 by means of flexible and adjustable slings 34 (FIGURE 6) which will be described in more detail below.

In the arrangement shown in FIGURE 1, which illustrates the types of force-exerting mechanisms of FIGURES 2, 3, or 13, to be described below, there is rigidly suspended below frame 29 a horizontal pair of parallel track members generally designated 35, along which a carriage or car 36 is adapted to travel. The inboard or left-hand ends of track members 35 are secured by detachable couplers 37 to brackets generally designated 38, which latter are usually detachably secured to the shell 39 of heat exchanger 22, from which the tube bundle 28 is to be extracted or into which it is to be replaced. This is illuustrated in further detail in FIGURES 2, 3, 9 and 10.

Referring now to FIGURES 2 and 3, which illustrate the screw-thread embodiment of the force-exerting mechanism, reference numeral 40 designates generally a prime mover, for example, an air-driven motor, mounted on a transverse connector for the outer ends of track members 35. A conduit 42 conveys compressed air from any suitable source (not shown) to motor 40 under the control of a reversing valve 43, which is in turn actuated by an articulated shaft 44 extending to a handle 45 within reach of an operator standing beside exchanger 22 on platform 21 of structure 20. Motor 40 is connected by gear box 46, sprockets 47, and chain 48 to drive both of a pair of shafts 49, which extend substantially throughout track members 35 and are received in suitable bearings 50 at each end of those track members.

Figure 5:
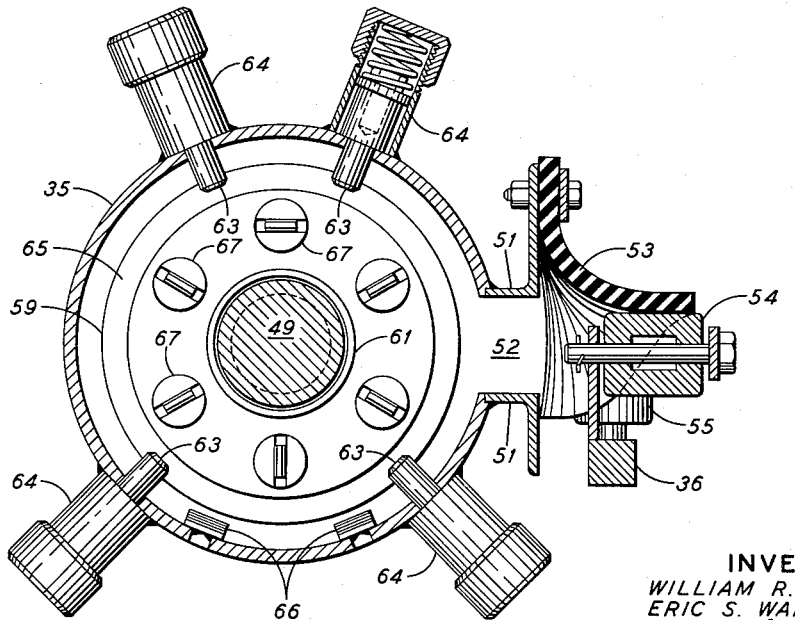
FIGURE 5 is a vertical transverse sectional view on line V—V of FIGURE 4.

Each track member 35 of this example is desirably tubular in section and is provided with opposed angle members 51 extending substantially throughout its length and facing inwardly to form a slot 52. As shown in FIGURE 5, this slot is normally covered by a flexible rubber or fabric shield or flap 53 secured by one edge to one member 51 to prevent access of dirt, moisture, and other detrimental conditions to the threaded shaft 49. An opening and closing means for the flap closure, consisting of rollers 54 and 55, may be provided for that part of each end of carriage 36 where it passes through slot 52 (FIGURE 5).

In FIGURE 3, carriage 36 is illustrated as being at the extreme left end of tracks 35 and extending transversely from one threaded shaft 49 to the other in a position to begin to withdraw tube bundle 28 from shell 39. The ends of carriage 36, in this example, comprise ball bearing nuts 56 within which threaded shafts 49 rotate so as to exert a substantial force toward the outboard end of frame 29 when withdrawing a tube bundle and to exert a similar force in the opposite direction to reinsert the bundle in its shell. Due to the long unsupported portion of each shaft 49 between its end bearings 50, which may be over 22 feet apart, it is desirable to provide an intermediate support for each shaft which will not interfere with the traverse of carriage 36 and nuts 56 completely throughout the length of track members 35. A preferred means for doing this is illustrated in detail in FIGURES 4 and 5 and indicated in FIGURES 2 and 3.

Figure 4:
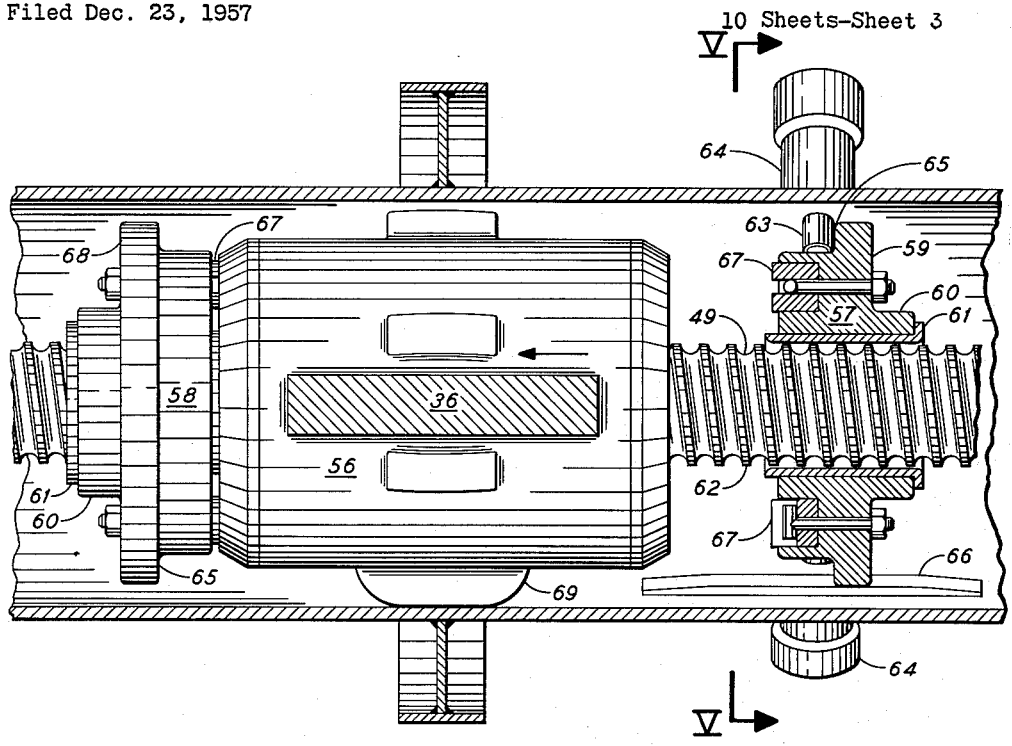
FIGURE 4 is a vertical sectional view illustrating an intermediate support means for the elongated shaft of the screw-thread type of extractor shown in FIGURES 2 and 3.

Referring now to FIGURE 4, there is illustrated at each end of nut 56 a pair of temporary bearing elements generally designated 57 and 58. Each of these elements consists of a circular flange 59 having a central boss 60 within which is a hollow bearing metal sleeve 61 adapted to engage and support the face of lands 62 of the threaded shaft 49. A plurality of radial stud members 63, which are slidably and resiliently mounted in outwardly extending housings 64, project inwardly through the shell of track member 35 at its midpoint and are illustrated as engaging the left-hand face 65 of flange 59. Within track members 35 at this point are a pair of metal ribs 66 (FIGURE 5) on which the lower periphery of flange 59 will rest and be supported when it is in the stationary or stopped position shown in FIGURE 4. It will be appreciated that in this position flange 59 will support shaft 49 at its central portion (FIGURE 3) so long as carriage 36 is in the left-hand half of tracks 35.

Referring again to FIGURE 4, the arrow on nut 56 indicates that it is traveling from right to left and has just left behind the right-hand temporary bearing member 57 in the position just described. To detachably secure this member to the right end face of steel housing of nut 56, there is provided in the left-hand face of flange 59 a plurality of permanent magnets 67 which are of sufficient strength to retain flange 59 of bearing member 57 against nut 56 during its motion from right to left until face 65 engages studs 63, at which point the attraction of the magnets will be broken and permit temporary bearing 57 to remain in the position shown. Before this occurs, however, nut 56 with member 57 secured to its right-hand face by magnets 67, will have engaged left-hand support member 58, pushed it away from its previous contact with studs 63, and expanded the studs outwardly by virtue of its chamfered ends so that nut 56 can pass beneath the inner ends of the studs. They will then spring back into position to engage face 65 of member 57.

A comparable and opposite-hand flange 68 is provided for temporary bearing member 58 at the left-hand face of nut 56. This flange 68 will follow nut 56 when it is traveling from left to right and will be retained by studs 63 to support the central portion of threaded shaft 49 when that nut is in the right-hand half of its travel and is carrying member 57 along ahead of it. This is llustrated in FIGURE 2, which shows the carriage 36 with the tube bundle 27 completely withdrawn from shell 39. Nut 56 will then be in its extreme right-hand position and temporary bearing 58 will be left in contact with studs 63 and supporting the central portion of the long threaded shaft 49. Desirably, nuts 56 are each provided with a downwardly extending bearing shoe 69, which will pass between ribs 66 and will ride along the inside of track 35 to support nut 56 of carriage 36 and shaft 49 at points intermediate the ends of the shafts and temporary bearings 57 or 58. Obviously, nuts 56 are retained against rotation by their rigid webbed connection to the opposite ends of carriage 36, as shown in FIGURE 3.

Figure 7:
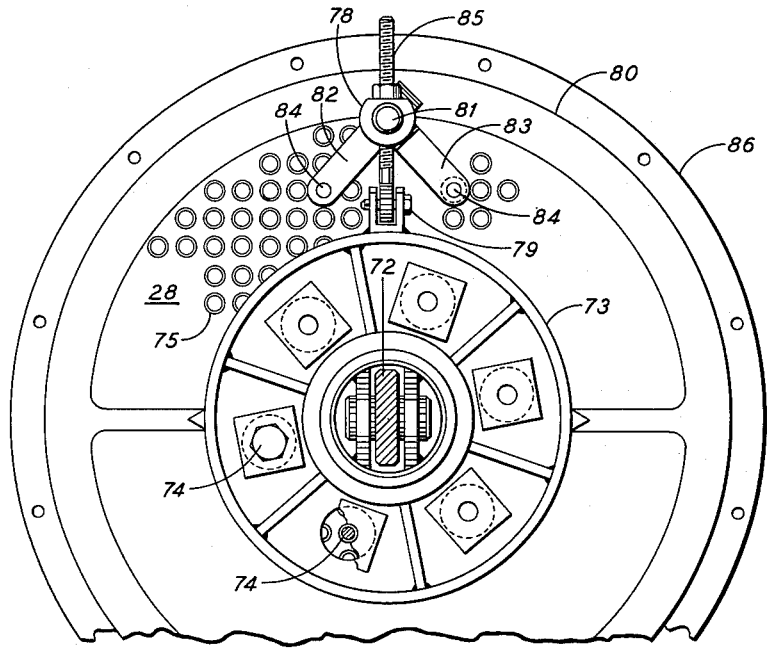
FIGURE 7 is a vertical transverse sectional view on line VII—VII of FIGURE 3, illustrating a preferred arrangement for securing the extracting mechanism to the tube sheet of the bundle to be withdrawn.
Figure 8:
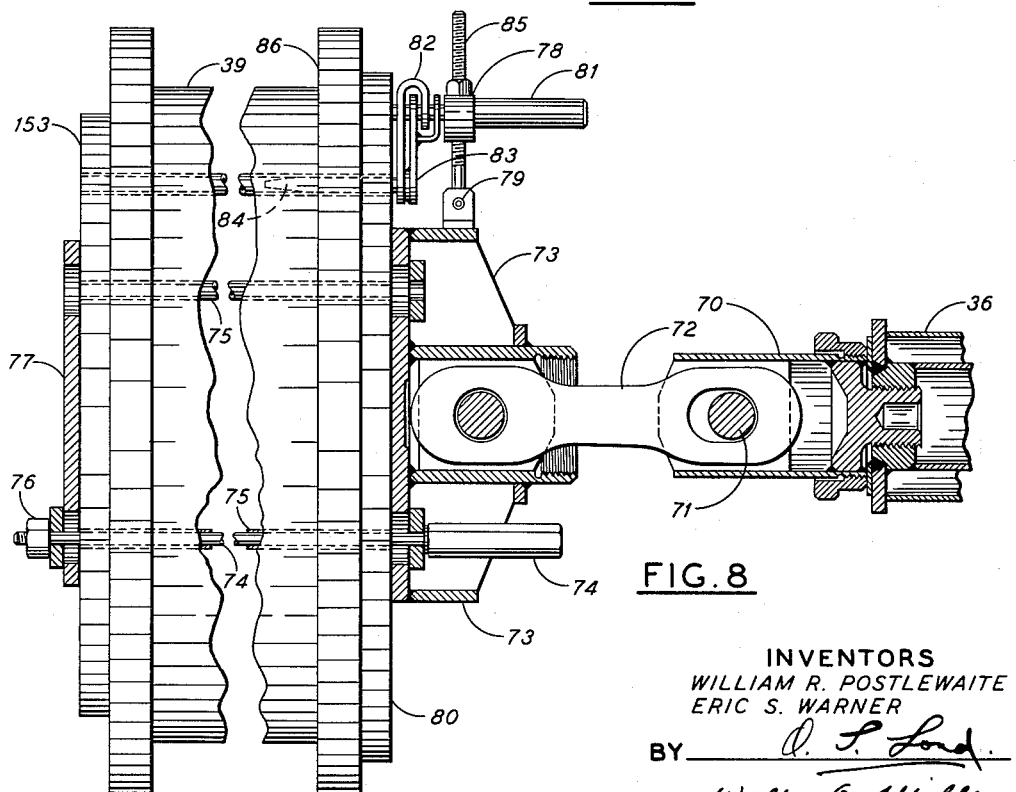
FIGURE 8 is a vertical longitudinal and part sectional view on line VIII—VIII of FIGURE 3, illustrating the entire tube bundle and the attachment means for the extractor.

Referring now to FIGURES 7 and 8, there is illustrated in those drawings the means for connecting carriage 36 to a tube bundle 28 to be removed from its shell 39. Referring first to FIGURES 3 and 8, a tubular connection 70 extends axially from carriage 36 and is connected by a manually detachable transverse pin 71 and horizontally pivoted link 72 to a face plate 73. Through-bolts 74 extend from face plate 73 through several tubes 75 of tube bundle 28 and are secured by nuts 76 to a backing plate 77 on the opposite end tube sheet of the tube bundle. Thus, carriage 36 is in a reciprocatable position, either to exert tension through link 72 to remove the bundle 28 from shell 39 or by removing link 72 and threading the outer end of tube 70 into the mating socket shown extending outwardly from face plate 73, to thrust against it and return the tube bundle to its place in shell 39.

Desirably, a vertically adjustable guide and support member generally designated 78 is pivotally connected at 79 to the top of face plate 73 so that it may be supported against the outboard tube sheet 80 of tube bundle 28 while through rods 74 are being inserted and made up. In this example, support member 78 consists generally of a horizontal handle 81 to which are pivotally secured a pair of radial arms 82 and 83, each of the latter having a pin 84 to project into a pair of tubes in tube bundle 28. A threaded bolt 85 connects handle 78 to face plate 73 and permits accurate vertical as well as transverse adjustment. Thus, the face plate may be properly placed in the center of tube sheet 80, and with through bolts 74 introduced into enlarged apertures in plate 73 to enter tubes 75 and extend throughout the tube bundle 28 to be secured to backing plate 77.

Figure 9:
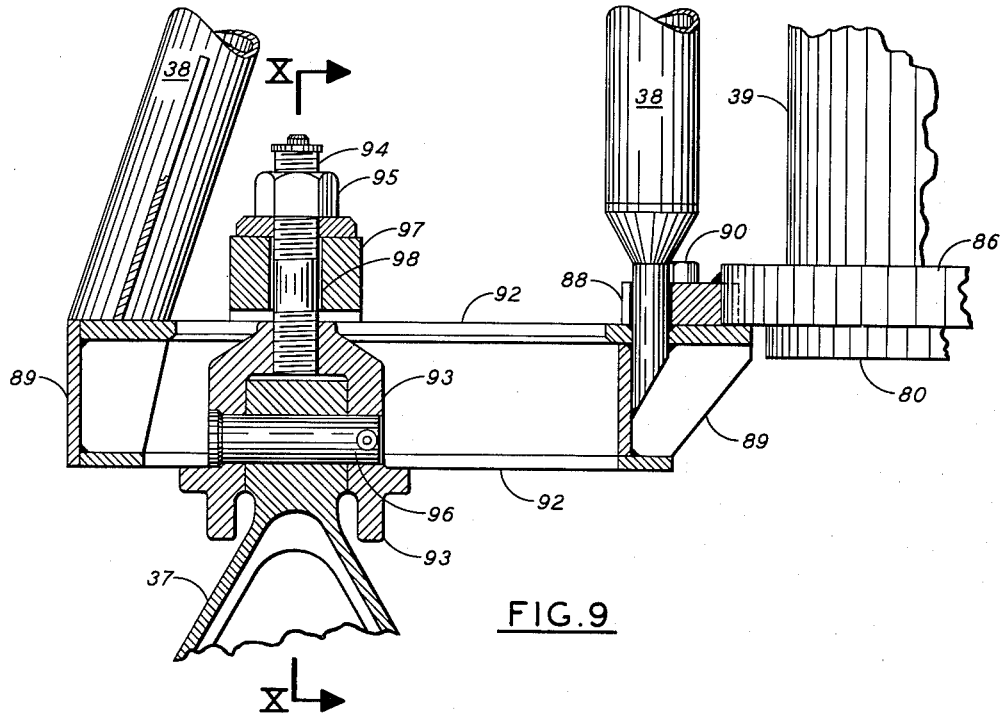
FIGURE 9 is a horizontal sectional view on line IX—IX of FIGURE 2, illustrating one means of attaching one means of attaching the mobile frame to the shell of the heat exchanger.
Figure 10:
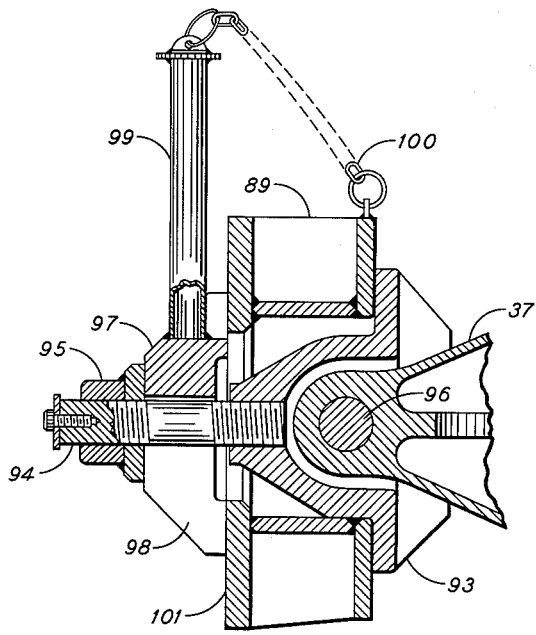
FIGURE 10 is a vertical longitudinal sectional view on line X—X of the arrangement shown in FIGURE 9, illustrating the hinged aligning connection.

Referring now to FIGURES 3, 8 and 9, a brief description will be given of the detachable coupling means generally designated 37 in the inboard ends of track members 35 to temporarily secure the frame assembly heretofore described to brackets generally designated 38, which are desirably removably secured to the shell 39 and end flange 86 of heat exchanger 22. It is well known to one skilled in this art that a considerable force, on the order of several (5 to 10) tons, must be occasionally applied to loosen and to pull a tube bundle 22 from its shell 39. To this end, bracket 38 must be arranged to be secured to the end flange 86 of shell 39 and to the shell proper by means which will not distort the shell or the flange but will still be sufficiently strong to transmit the needed force thereto. In this example, two brackets 38 are provided, one for each side of the exchanger. They are secured between a permanently mounted stiffening ring 87 welded or otherwise fastened to the shell 39 at a suitable distance from end flange 86 and a pair of lugs 88 diametrically opposed and secured on opposite sides of the end flange 86 of the shell. In this example, the base 89 of each bracket 38 is secured to its lug 88 by bolts 90 (FIGURE 9). The opposite ends of brackets 38 terminate in a pin 91 which extends through an appropriate hole in ring 87 (FIGURE 3).

FIGURE 9 illustrates a preferred form of the connection between base 89 of bracket 38 and coupling 37 at the inboard end of each tubular track member 35. In order to accommodate heat exchanger shells and tube bundles of varying diameter, ranging from about 18 inches to about 36 inches in diameter, base 89 is slotted horizontally as at 92 to accommodate a horizontally hinged socket member 93 which may be secured against both faces of base 89 by means of bolt 94 and nut 95. A pin 96 pivoted in member 93 connects it to the end of the coupling and permits coupling 37 to rotate in a vertical plane so that it may be aligned with the axis of the heat exchanger 22 to which the extractor is secured. A strong-back 97, slotted vertically as at 98 and provided with a handle 99 and retaining chain 100, is used as a clamp between nut 95 and the rear face 101 of base 89 to permit stabbing the coupling means 37 and socket member 93 into slot 92 and connecting them rapidly and safely to base 89 of bracket 38.

Figures 6, 19:
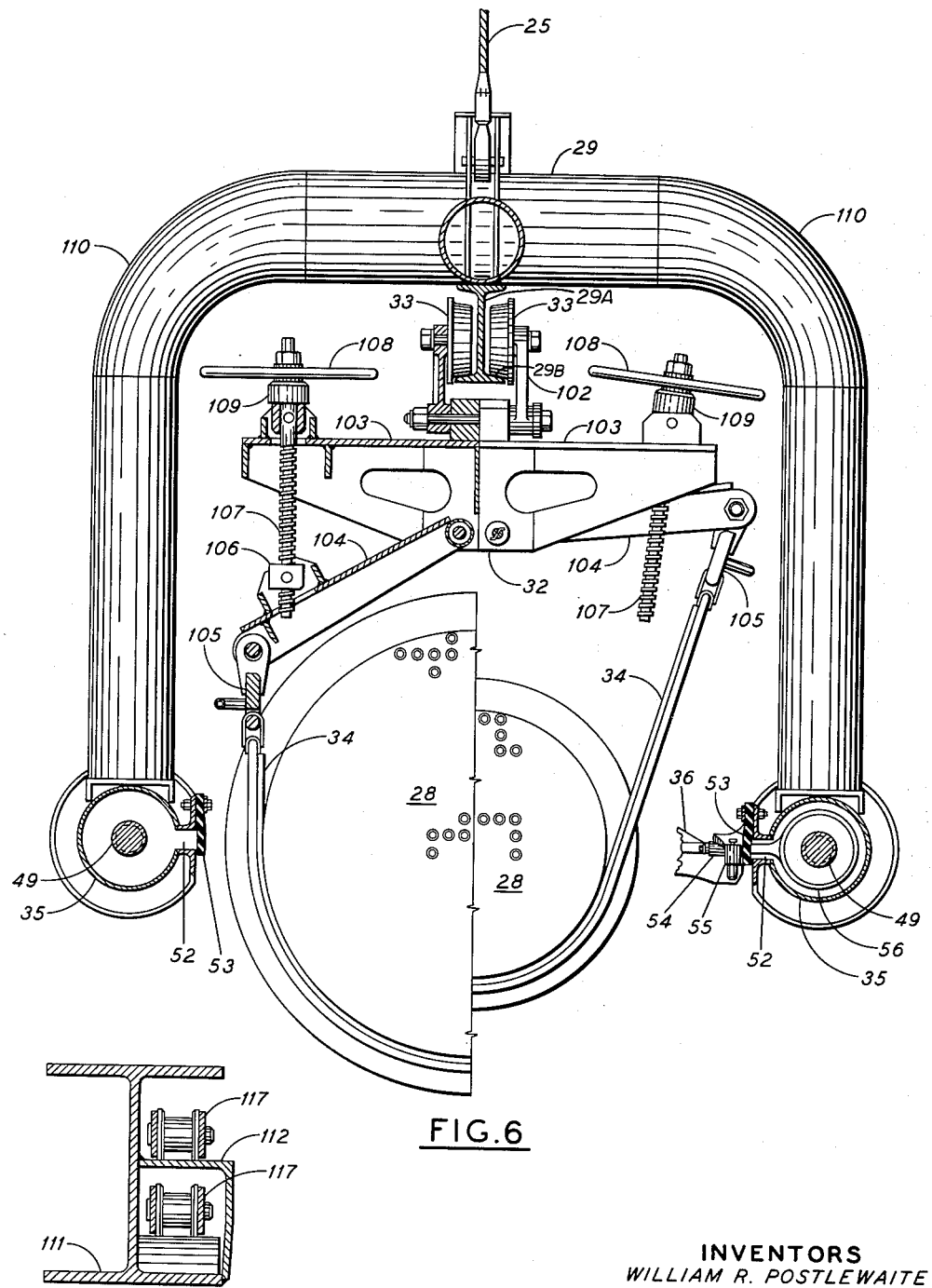
FIGURE 6 is a vertical transverse and part sectional view on line VI—VI of FIGURE 2, illustrating a preferred arrangement of a sling for adjustably supporting the tube bundle intermediate its length during its withdrawal or replacement.
FIGURE 19 is a vertical transverse sectional view on line XVIV—XVIV of FIGURE 12, showing the support means for the upper and lower portions of the force-transmitting chain 117 of that figure.

As pointed out above, it is necessary accurately to support the closely fitted tube bundle 28 as it is introduced into or withdrawn from its shell 39. Two or more intermediate support and alignment slings 34 are preferably provided for this purpose, each one being suspended flexibly at both ends from a frame generally designated 32, already mentioned, which is movable longitudinally with respect to frame 29 by means of rollers 33. Referring now to FIGURE 6, there is illustrated a preferred arrangement of the adjusting mechanism for one sling 34, the right-hand side of the illustration showing it in place on a small diameter tube bundle, and the left-hand side showing it in position to support a larger diameter tube bundle 28. Frame 32 is suspended from rollers 33 by side plates 102, which are in turn connected to a cross-member 103. A pivoted arm 104 on each side of member 103 carries at its outer end a link 105 between which is supported flexible sling 34. Intermediate the end of each arm 104 is a pivoted nut 106 connected by a threaded rod 107 to an adjusting wheel 108 resting upon a pivoted nut 109 at the top of cross-member 103. Suitable manipulation of both wheels 108 will move sling 34 to accommodate either a small diameter tube bundle or a larger one, or to rotate the bundle as desired to match its orientation in the shell 39 and still maintain its axis accurately in the center of the frame and at the desired elevation with respect to that of the heat exchanger shell 39.

So far, this description has concerned the screw-thread reciprocating carriage embodiment of FIGURES 2 and 3, wherein a pair of generally tubular track members are suspended from each side of frame 29 by rigid means such as yokes 110. The motive power for moving carriage 36 and bundle 28 toward and from heat exchanger shell 39 is supplied by means such as motor 40 at the outboard end of the frame acting through threaded shafts 49 upon nuts 56.

Figure 11:
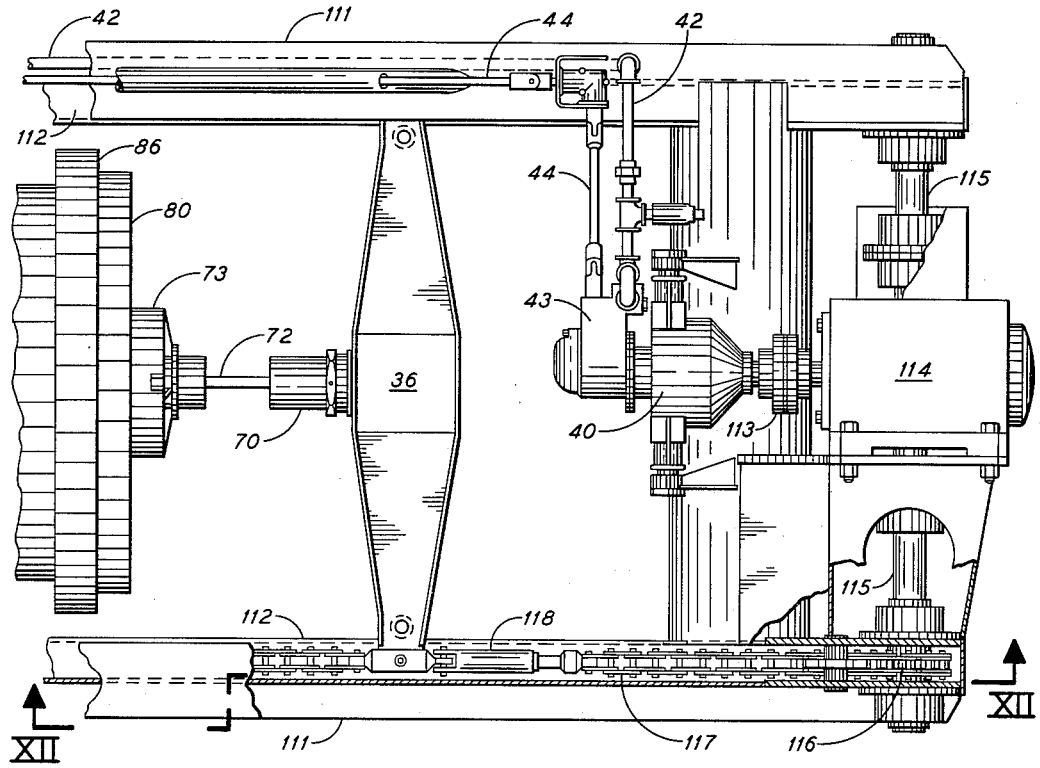
FIGURE 11 is a part sectional plan view of the outer end of a mobile frame having an alternative force-exerting mechanism (chain and sprocket) to the screw-thread mechanism of FIGURES 2 to 5, inclusive.
Figure 12:
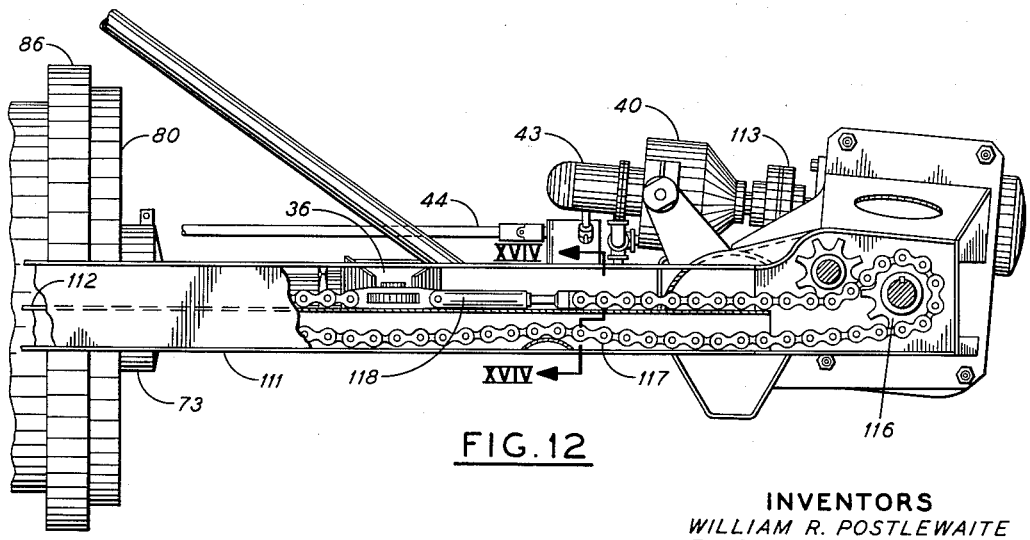
FIGURE 12 is a vertical and part sectional side elevational view on line XII—XII of the arrangement of FIGURE 11.

An alternative motive power arrangement is illustrated in detail in FIGURES 11 and 12, to which reference is now made. In that embodiment, the prime mover or motor 40 is similarly mounted at the outboard end of a pair of tracks 35 which consist of steel I-sections 111 provided with an intermediate horizontal flat guide member 112. Motor 40 is connected by coupler 113 to a gear box 114 from each side of which a shaft 115 extends to terminate within suitable bearings in I-sections 111 and to be fitted with a power sprocket 116. At the opposite or inboard end of each member 111 from power sprocket 116 is an idler sprocket (not shown), around which an endless steel link chain 117 extends to return along guide 112 to power sprocket 116. In this example, carriage 36 (FIGURE 11) is pivotally secured at each end to a longitudinally resilient connector 118 in chains 117 to absorb stretch of the chains due to heavy tension loads. Thus carriage 36 may be moved inwardly and outwardly along tracks 35 by chains 117 under the control of the operator, who manipulates the articulated shaft 44 to operate reversing valve 45 and control air from supply conduit 42 to motor 40. Due to the nature of lubrication factors for chain drives, as compared to threaded shafts, there will ordinarily be no need to shield the upper part of the chains from dust or weather conditions. The lower part may be permanently housed, as indicated at the left-hand side of FIGURE 19.

The embodiments described heretofore involve a carriage or car 36 which travels in a single stroke the full length of the frame of the device and with the motive power 40 for that travel desirably located at the outboard end of the frame. The next embodiment to be described (FIGURE 13) utilizes a movable car 36 which carries its own motive power 40 and advances by a series of succession of steps, the carriage being provided with means for selectively engaging the side frame members 119, which correspond in function to 35 and 111 of the previous embodiments. In this arrangement car 36 is provided at each corner with a wheel 120 resting upon the lower horizontal flange 121 of side members 119. A cylindrical housing 122 is secured to one end of car 36 as by bolts 123 and supports in bearings 124 at each end on elongated internally threaded nut generally designated 125. Desirably, but not necessarily, this is of the ball bearing type, in which a plurality of steel balls 126 circulate in a suitable helical groove which mates with a similar groove in an internal hollow shaft 127. Shaft 127 is restrained from rotation by means of a splined shaft 128 secured at 129 to the opposite end of car 36 from housing 122.

The inboard end of hollow shaft 127 is threaded as at 130 to the tubular connection 70 which may either be secured by link 72 to the face plate 73 previously described or threaded directly to that plate (FIGURE 8) for attachment to the end tube sheet of the heat exchanger tube bundle 28 to be withdrawn from its shell or introduced therein.

In this example the hollow shaft 127 is reciprocated with respect to car 36 by means of a rotatable nut 125, the outboard end of which engages a hollow quill 131 extending through gear box 132 and adapted to be turned in the desired direction by reversible motor 40.

Figure 13:
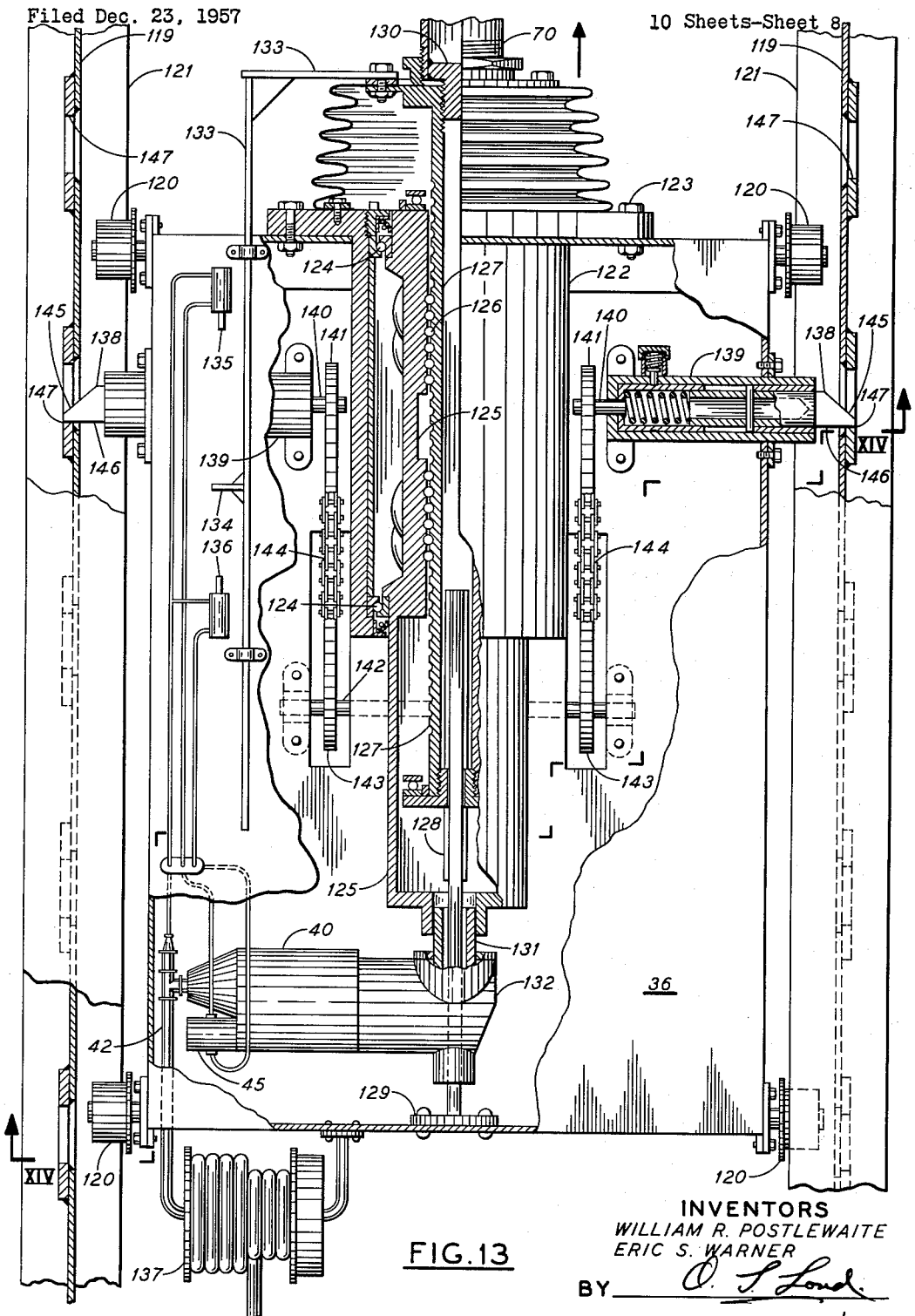
FIGURE 13 is a part sectional plan view of an alternative screw-thread arrangement to that of FIGURES 2 to 5, inclusive, in which the reciprocating force-exerting mechanism does not extend for the full length of the mobile frame, but progresses along it in a series of steps.

In FIGURE 13 the mechanism is illustrated in position to urge shaft 127 and the tubular connection 70 away from the restrained and hence stationary car 36, as will be the case when a tube bundle 28 is to be inserted into a heat exchanger shell 39. It will be recalled that this embodiment differs from the preceding one in advancing or retracting the tube bundle in a series of short steps rather than in a single stroke. Accordingly, the car 36, bearing its prime mover, is selectively restrained with respect to side members 119 while shaft 127 and connector 70 are alternately extended and retracted with respect to the threaded nut 125.

In the position shown in FIGURE 13, the shaft and connector are moving in the direction indicated by the arrow. The control of this reciprocating motion is carried out by means of a rod 133 carried by the end of shaft 127, this rod being bent at right angles to be parallel to the motion of the shaft, and provided intermediate its ends with a lug 134 which alternately actuates pilot valves 135 and 136 connected by appropriate tubing to reversing valve 45 to control the direction of rotation of motor 40. As in the preceding embodiments, motor 40 is driven by a fluid such as air under pressure through conduit 42 and, in this arrangement, a flexible hose reel 137 which may be supplied with compressed air from any suitable source (not shown).

Figure 14:
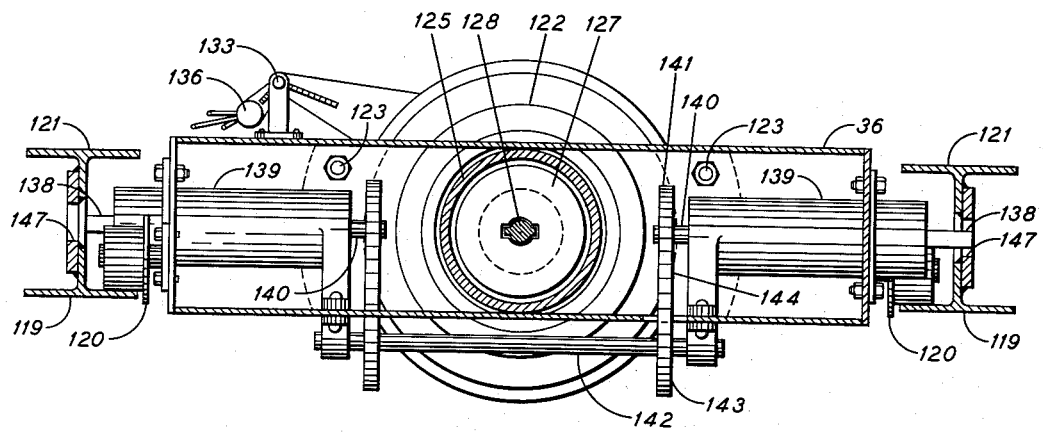
FIGURE 14 is a vertical sectional detail view on line XIV—XIV of FIGURE 13, illustrating a reversing arrangement for selectively securing that force-exerting mechanism to the mobile frame.

Car 36 is provided on each side (FIGURES 13 and 14) with a reversible pawl 138, each of which is slidably and extensibly mounted in a rotatable guide housing which is in turn mounted in an outer fixed housing 139. Each pawl unit terminates at its inner end in a shaft 140 carrying a sprocket wheel 141. A transverse lay shaft 142 beneath car 36 and carrying sprockets 143 is connected by an endless steel chain 144 to each of sprockets 141 so that rotation of either pawl unit 138 in its housing 139 will also rotate the other pawl. Either or both of said pawls is desirably flattened at its outer end so that it may be engaged with means such as a socket wrench and rotated manually so that its chamfered face 145 may be oriented through 180 degrees, for a purpose which will now be explained.

In the arrangement shown, car 36 is to be restrained from moving in a direction opposite to that indicated by the arrow showing the direction of motion desired for shaft 127 and connector 70 to make a tube bundle insertion. Accordingly, pawls 138 are simultaneously and manually rotated as shown so that their flat faces 146 engage opposite apertures 147 in side members 119 to provide this restraining force. After shaft 127 and connector 70 have been extended throughout their full travel, lug 134 will engage pilot valve 135 and reverse the direction of motor 40. When this occurs and due to the larger mass of the tube bundle 22 to which connector 70 is secured and the frictional engagement of one end of the tube bundle now inserted part way into the exchanger shell, the lighter and wheel-supported car 36 will be moved in the direction of the arrow. The chamfered faces 145 of pawls 138 will retract those pawls and permit the car to move ahead until lug 134 of the reversing mechanism engages pilot valve 136 to rotate motor 40 in the opposite direction.

The pitch or longitudinal spacing of apertures 147 in side members 119 is desirably slightly less than the full stroke of shaft 127 in nut 125 to insure positive and complete engagement of both of the pawls 138 before the reversing mechanism just described acts to move the nut in the opposite direction to perform what may be termed a power stroke, as distinguished from a car-advancing stroke.

To withdraw a tube bundle by the mechanism just described, the operator first manually rotates either one of pawls 138 through 180 degrees as by a socket wrench. Chain 144 will be effective to rotate the opposite pawl in the same direction at the same time so that upon admission of the air to motor 40, the car 36 will proceed to travel in a succession of alternate car-advancing steps and power strokes in the opposite direction.

Referring now to the embodiment illustrated in FIGURES 15, 16, 17 and 18, there is provided a frame 29 supported by a sling 25 from the hook 26 of a mobile crane (FIGURE 1). As in the previous arrangements, frame 29 is provided with vertically offset means for aligning and coupling it to the end flange 86 of a heat exchanger shell 39. For reasons which will be pointed out below, this offset coupling means, which is generally designated 148, may be much more simple than those of the preceding embodiments. Its purpose and function, however, are the same, namely, to align frame 29 with the heat exchanger shell 39 and the tube bundle 28 to be extracted or replaced so that slings 34 which depend from carriages 32 may support the tube bundle 22 intermediate its ends as it moves longitudinally with respect to frame 29. In this arrangement no horizontal extraction or insertion reaction forces are transmitted to the frame.

As illustrated in FIGURE 17, coupling means 148, in this example, consists merely of a pair of bolts 149 carried by a face plate 150 at the end of member 29 and adapted to be received in appropriate holes in a lug 151 permanently secured as by welding to the rim of heat exchanger flange 86. It will be understood that the radial distance of these holes may be different for each diameter of flange 86, and the axis of the force-exerting means may be adjusted vertically to be aligned with the shell by adjustment of the slings 34.

One of the arrangements heretofore discussed involved the use of a prime mover supported by and secured to frame 29 (FIGURES 1, 2 and 3) and adapted to reciprocate or move a carriage 36 throughout a single stroke of sufficient length to completely remove or to replace a tube bundle 28. The embodiment of FIGURES 13 and 14 utilizes a prime mover carried by the car 36 adapted to be supported by side members from frame 29 and to reciprocate and thus to move the tube bundle 28 in a succession of relatively short steps. Carrying the basic concept of this invention still further, the arrangement of FIGURES 15, 16, 17 and 18 utilizes a prime mover, in this case a reciprocating impact hammer 152, the housing or frame of which is secured directly to one of the end sheets of the tube bundle 22 to exert forces directly thereon to move it in a succession of very short steps either into or out of shell 39. This has the advantage of not requiring the parallel side frame members 35 or 111, or 119, and in addition is somewhat less complex heavy and expensive than either of the preceding embodiments.

Referring now to FIGURE 15, there is illustrated such an impact hammer 152 having its working face or base secured by through bolts 74 and a face plate 77 to the inboard or floating tube sheet 153 of tube bundle 28. Fluid pressure, for example steam or compressed air, is transmitted to impact hammer 152 through a flexible conduit 154, under the control of the operator who stands on one of the platforms 21 of structure 20. Impact hammer 152 acts in the nature of a small pile driver against its base 155. A typical example would be a unit having a reciprocating ram or hammer weighing about 70 pounds and operating about 400 blows per minute. With 100 p.s.i.g. compressed air as a motive power fluid, this will develop about 350 foot pounds of energy per blow. Such a rapid repetitive action of force applied to one face of the bundle not only urges it readily out of or into the shell 39, but also serves to break loose deposits of coke or other obstructing material that may tend to retain it in the shell.

To replace a tube bundle 28 into shell 39, the working face of impact hammer may be secured directly to the outboard end of the tube sheet as shown in FIGURE 16 with its base 155 secured to face plate 77, whereupon application of pressure fluid through conduit 154 will actuate hammer 152 to cause bundle 28 to travel into shell 39 while it is supported by slings 34 from carriages 32 movable with respect to frame 29.

FIGURE 18 illustrates the impact force-exerting means 152 in a position to act in the direction opposite from that of either FIGURES 15 or 16. It may be desirable, in certain circumstances, to remove bundle 28 by pulling it out of the shell as by means of a tension force exerted through rods 74. To do this, the frame of impact means 152 is simply reversed in position with respect to face plate 77, with its working face or base 155 at the outer end and its top plate 156 secured to plate 77. Thus its effective hammer blows are exerted in an outward direction with respect to shell 39. Impact means of the type described are commonly made to be reversed in these mounting means or frames as for driving and pulling sheet piling or the like.

In conclusion it will be appreciated that this invention comprehends broadly the provision of a frame or support means adapted to be aligned with and secured to the means such as a heat exchanger, with longitudinally movable slings to receive and support a tube bundle which is to be extracted from the shell or exchanger or replaced therein by a force exerted against one of the tube sheets, this force being provided either by a prime mover mounted on the frame, or a carriage or car supported from the frame, or by the direct application of forces due to rapidly repeated impulses against one tube sheet of the exchanger.

Although several embodiments have been illustrated and described, it is obvious that numerous changes could be made without departing from the essential features of the invention and all such changes that come within the scope of the appended claims are intended to be embraced thereby.

We claim:

1. A tube bundle extractor comprising an elongated frame, said frame including a means for supporting a trolley beam in parallel alignment with the axis of and above one end of a shell containing a separable tube bundle having end sheets, means for securing one end of said frame to said shell, longitudinally movable means supported below said trolley beam to engage said tube bundle when it is extended at least partially out of said shell, and force-exerting means adapted to be secured to a tube sheet of said bundle to move it relatively to said shell and along said trolley beam, said force-exerting means comprising a reciprocating member, and means for selectively reversing the direction of effective motion of said member.

2. A tube bundle extractor comprising an elongated frame having a pair of longitudinally spaced members to which means for suspending said frame are attached, means for supporting a trolley beam on said frame in parallel alignment with the axis of and above one end of a shell containing a separable tube bundle having end sheets, two parallel side members of said frame supported below said trolley beam in substantially the same horizontal plane as the axis of said shell, means for securing one end of said frame to said shell, longitudinally movable means supported below said trolley beam to engage said tube bundle when it is extended at least partially out of said shell, force-exerting means adapted to be secured to a tube sheet of said bundle to move it relatively to said shell and along said trolley beam, said side members supporting said force-exerting means while it acts to move said bundle relatively to said shell and said frame.

3. A tube bundle extractor comprising an elongated frame including means forming a trolley beam integral therewith, means for supporting said frame to align said trolley beam above one end of a shell containing a separable tube bundle having end sheets, a plurality of flexible sling means supported below said trolley beam with at least one of said sling means movable with respect to another of said sling means and to said trolley beam and also movable to support said tube bundle when it is extended at least partially out of said shell, and force-exerting means adapted to be selectively connected between said frame and an end sheet of said tube bundle to move said tube bundle relative to said shell and to said frame while said tube bundle is at least partially supported by said flexible sling means.

4. A tube bundle extractor comprising an elongated frame including means forming a trolley beam integral therewith, means for supporting said frame to align said trolley beam above one end of a shell containing a separable tube bundle having end sheets, a plurality of flexible sling means supported below said trolley beam with at least one of said sling means movable with respect to another of said sling means and to said trolley beam and also movable to support said tube bundle when it is extended at least partially out of said shell, and force-exerting means adapted to be secured to an end sheet of said tube bundle and to engage said frame to exert force between said tube bundle and said frame to move said tube bundle relative to said shell and to said frame.

5. A tube bundle extractor comprising an elongated movable frame having parallel side members, means for suspending said frame to be aligned with the end of a shell containing a tube bundle having end sheets, means for securing one end of said frame to said shell, a carriage reciprocatably mounted in said frame between said side members, means on said carriage for detachably securing it to an end sheet of said tube bundle, means for selectively moving said carriage longitudinally along said side members to withdraw said tube bundle from said shell and to insert it therein, longitudinally movable means supported in said frame independently of said carriage to engage said tube bundle intermediate its ends when it extends at least partially out of said shell and for imparting limited rotation to said tube bundle to orient it with respect to said shell.

6. A tube bundle extractor comprising an elongated movable frame having parallel side members, means for suspending said frame to be aligned with the end of a shell containing a tube bundle having end sheets, means for securing one end of said frame to said shell, a carriage reciprocatably mounted in said frame between said side members, means on said carriage for detachably securing it to an end sheet of said tube bundle, means for selectively moving said carriage longitudinally along said side members to withdraw said tube bundle from said shell and to insert it therein, said last-named means comprising an endless chain carried by each side member, resilient means connecting each chain to one side of said carriage and a reversible motor on said frame for synchronously driving said chains.

7. A tube bundle extractor comprising an elongated movable frame having parallel side members, means for suspending said frame to be aligned with the end of a shell containing a tube bundle having end sheets, means for securing one end of said frame to said shell, a carriage reciprocatably mounted in said frame between said side members, means on said carriage for detachably securing it to an end sheet of said tube bundle, means for selectively moving said carriage longitudinally along said side members to withdraw said tube bundle from said shell and to insert it therein, said last-named means comprising a threaded shaft carried by each said side member, a threaded nut on each said shaft for connecting said shaft to said carriage, a reversible motor on said frame for rotating said shafts, and means carried by each of said shafts for selectively engaging said members intermediate their ends to limit deflection of the unsupported portion of said shaft.

8. A tube bundle extractor comprising an elongated movable frame having parallel side members, means for suspending said frame to be aligned with the end of a shell containing a tube bundle having end sheets, means for securing one end of said frame to said shell, a carriage reciprocatably mounted in said frame between said side members, means for detachably connecting said carriage to an end sheet of said tube bundle and with the length of said means selectively reciprocatable with respect to said carriage, means for selectively moving said carriage longitudinally along said side members to withdraw said tube bundle from said shell and to insert it therein, and means for selectively securing said carriage to said side members at a plurality of spaced points therealong.

References Cited by the Examiner

UNITED STATES PATENTS

| | | | |
|---|---|---|---|
| 521,309 | 6/1894 | Davis | 212—135 X |
| 1,323,575 | 12/1919 | Brake | 212—135 |
| 1,393,218 | 10/1921 | Herrbold | 212—74 |
| 1,671,252 | 5/1928 | Moore | 212—11 |
| 2,279,340 | 4/1942 | Postlewaite. | |
| 2,692,565 | 10/1954 | Cummings. | |
| 2,695,594 | 11/1954 | Fairburn. | |
| 2,811,240 | 10/1957 | Fenton | 214—16.4 X |
| 2,857,922 | 10/1958 | Effinger | 214—17 X |

OTHER REFERENCES

Power Magazine, vol. 59, No. 26, June 24, 1924, pp. 1032 and 1033.

MARVIN A. CHAMPION, *Primary Examiner.*

ERNEST A. FALLER, HUGO O. SCHULZ, MORRIS TEMIN, GERALD M. FORLENZA, *Examiners.*

J. FAIRCHILD, P. L. HENRY, *Assistant Examiners.*